United States Patent [19]
Lam et al.

[11] Patent Number: 5,859,611
[45] Date of Patent: Jan. 12, 1999

[54] MIXING AND MODULATING METHODS AND STRUCTURES USING NONLINEAR OPTICAL AMPLIFIERS

[75] Inventors: Juan F. Lam, Agoura Hills; Ronald R. Stephens, Westlake Village; Gregory L. Tangonan, Oxnard, all of Calif.

[73] Assignee: Hughes Electronics Corporation, El Segundo, Calif.

[21] Appl. No.: 803,963

[22] Filed: Feb. 21, 1997

[51] Int. Cl.$^6$ .............................. H01Q 3/22; G02F 1/03
[52] U.S. Cl. .......................... 342/368; 359/245; 359/278
[58] Field of Search ................................. 359/245, 278, 359/279, 188, 195; 392/368, 54; 327/119, 123

[56] References Cited

U.S. PATENT DOCUMENTS

| | | | |
|---|---|---|---|
| 3,090,928 | 5/1963 | Welty | 331/38 |
| 5,166,821 | 11/1992 | Huber | 359/238 |
| 5,323,406 | 6/1994 | Yee et al. | 372/26 |
| 5,617,239 | 4/1997 | Walker | 359/181 |
| 5,687,261 | 11/1997 | Logan | 385/24 |
| 5,710,651 | 6/1998 | Logan, Jr. | 359/145 |

OTHER PUBLICATIONS

Logan, Ronald T., et al., "Millimeter–Wave Photonic Downconverters: Theory and Demonstration", *Proceedings of SPIE Conference on Optical Technology for Microwave Applications VII*, Jul. 9–14, 1995.

Newirk, M.A., et al., "1.5 um Multiquantum–Well Semiconductor Optical Amplifier with Tensile and Compressively Strained Wells for Polarization–Independent Gain", *IEEE Photonics Letters*, vol. 4, No. 4, Apr. 1993.

*Primary Examiner*—Mark Hellner
*Attorney, Agent, or Firm*—V. D. Duraiswamy; W. K. Denson-Low

[57] ABSTRACT

Mixing and modulating methods are described for nonlinear optical amplifiers (30) which can generate intermodulation products of radio-frequency signals in an optical carrier signal (26) without the penalty of an optical conversion loss and without the need for radio-frequency mixers, electro-optic modulators and expensive polarization-maintaining optical fibers. The radio-frequency signals can be applied to either a bias port (36) or an optical input port (32) of the optical amplifier and are used to upconvert and downconvert signals in phased-array antenna and remote antenna embodiments of the invention.

50 Claims, 7 Drawing Sheets

MIXING AND MODULATING METHODS AND STRUCTURES USING NONLINEAR OPTICAL AMPLIFIERS

GOVERNMENT RIGHTS

This invention was made with Government support under Agreement No. MDA972-95-3-0007 awarded by the Government. The Government has certain rights in the invention.

BACKGROUND OF THE INVENTION

1. Field of the Invention

The present invention relates generally to optical signal modulation.

2. Description of the Related Art

Passing two (or more) electromagnetic input signals through a nonlinear process is known to generate intermodulation products whose frequencies are the sums and differences of integral multiples of the frequencies of the input signals. For example, if the input signals have angular frequencies of $\omega_1$ and $\omega_2$, the intermodulation products will have frequencies of $n\omega_1 \pm m\omega_2$. In particular, sum and difference signals are generated which have frequencies of $\omega_1+\omega_2$ and $\omega_1-\omega_2$ respectively. Other exemplary intermodulation products are third-order products having frequencies such as $2\omega_1-\omega_2$ and $2\omega_2-\omega_1$. In addition, a nonlinear process typically generates input signal harmonics having frequencies such as $2\omega_1$ and $2\omega_2$.

The nonlinearities of semiconductor diodes have been extensively employed to construct radio-frequency mixer structures. In an exemplary mixer use, an intermediate frequency (IF) signal is mixed with a local oscillator (LO) signal to generate (typically with filtering to remove other products) a radio-frequency (RF) signal, i.e., the IF signal is upconverted by the LO signal to form an RF signal. Conversely, an RF signal can be mixed with an LO signal to generate (again with filtering to remove other products) an IF signal, i.e., the RF signal is downconverted by the LO signal to form an IF signal.

In many applications, it is desirable to transport the upconverted or downconverted signal to a remote site, i.e., a site that is removed from that of the modulation process. For example, space is typically limited in the region of a phased-array antenna so that upconverted and downconverted signals are often generated at the antenna and then transported between the antenna and signal processing circuits which are spaced away from the antenna.

Because radio-frequency transmission lines (e.g., coaxial cables) are relatively lossy (especially at microwave and millimeter-wave frequencies), optoelectronic systems have been developed to perform this transmission between sites with optical carrier signals in optical fibers. Optical fiber loss is typically much reduced from that of radio-frequency transmission lines.

An example of such an optoelectronic system is "antenna remoting" in which radio-frequency signals (often generated by mixing operations) are modulated onto optical carrier signals with electro-optic modulators (e.g., directional coupler and Mach-Zehnder modulators formed in lithium niobate substrates). The modulated optical signal is conducted with an optical fiber between a signal-processing site and a remotely located antenna which is part of a communication system (e.g., an antenna site on a mountain peak with links to other communication sites such as communication satellites). The radio-frequency signals can be recovered at either site by detecting the optical carrier with a photodetector.

Optoelectronic systems such as phased-array antennas and antenna remoting thus often combine radio-frequency mixing operations and electro-optic modulating operations. Particularly in a phased-array antenna, these optoelectronic systems typically involve excessively large numbers of radio-frequency mixers (and attendant amplifiers) and electro-optic modulators.

In addition, the electro-optic modulators have a number of problems. Their modulation is sensitive to the polarization of optical signals so they must be connected in a system with polarization-maintaining optical fibers. These fibers are quite expensive and their use in long distance applications, e.g., antenna remoting, adds considerable system cost. In addition, the modulators have an optical conversion loss (typically >3 dB) and their performance is sensitive to temperature.

Accordingly, development efforts have been directed to mixing and modulating processes and structures which can reduce these large parts counts in optoelectronic systems by combining radio-frequency mixing and optical modulating operations. Preferably, such processes and structures would produce less optical conversion loss than electro-optic modulators and eliminate the need for expensive polarization-maintaining optical fibers.

An exemplary development is a millimeter-wave photonic downconverter which was described by Logan, Ronald T., et al. (Logan, Ronald T., et al., "Millimeter-Wave Photonic Downconverters: Theory and Demonstration", Proceedings of SPIE Conference on Optical Technology for Microwave Applications VII, Jul. 9–14, 1995). The downconverter includes a Mach-Zehnder modulator and a dual-frequency laser. The laser generates a dual-frequency optical signal having a frequency separation between the optical modes equal to a desired LO frequency.

This optical LO signal is applied to the optical input port of the Mach-Zehnder modulator and an RF signal is applied to the modulation port of the modulator. For example, Logan, et al. coupled a 28 GHz RF signal and a dual-frequency laser with a frequency separation of 8.6 GHz to a Mach-Zehnder modulator to generate a 19.4 GHz difference signal and a 36.6 GHz sum signal which were then recovered from the optical carrier signal with a photodetector. Although this structure generates sum and difference signals in an optical carrier without the need for radio-frequency mixers, it relies upon an electro-optic modulator which has the previously mentioned problems.

SUMMARY OF THE INVENTION

The present invention is directed to mixing and modulating methods and structures which can generate intermodulation products of radio-frequency signals on an optical carrier without the penalty of an optical conversion loss and without the need for radio-frequency mixers, electro-optic modulators and expensive polarization-maintaining optical fibers.

These goals are realized with an intermodulation generating process that amplifies an optical carrier signal through an optical amplifier which has a nonlinear transfer function between an optical input port and an optical output port. The optical amplifier also has a bias port and electronic signals are coupled into either the bias port or the optical input port.

The nonlinear transfer function generates intermodulation products of the electronic signals and simultaneously modulates them onto an amplified optical carrier signal at the optical output port. The modulated and amplified optical carrier signal can be transported to a remote site in low-loss optical fibers and the intermodulation products detected by a photodetector. Subsequent filtering can be used to produce a desired product, e.g., a sum or a difference product.

Thus, mixing and modulating methods of the invention generate intermodulation products in optical carriers without the need for radio-frequency mixers and electro-optic modulators. The use of a semiconductor optical amplifier (SOA) as the nonlinear optical amplifier has the additional advantage that its fabrication techniques (e.g., photolithography) facilitate its integration with other system structures on semiconductor chips. Preferably, polarization-insensitive SOA's are used to avoid the cost of polarization-maintaining optical fibers. SOA's accept electronic signals over a wide range of radio frequencies (e.g., microwave and millimeter-wave) and provide optical gain (typically>10 dB).

The ability to couple electronic signals into either the bias port or the optical input port lends nonlinear optical amplifiers a versatility which can be advantageously used in optoelectronic systems, i.e., an electronic signal can be coupled directly into the bias port or modulated onto an optical signal and carried into the optical input port by means of an optical fiber.

For example, an antenna array embodiment of the invention includes an array of receptive antenna elements that each receive a portion of a radio-frequency signal, a plurality of optical amplifiers which have their bias ports coupled to the receptive elements to receive their radio-frequency signal portions and a plurality of photodetectors which are coupled to detect optical signals from the optical amplifiers' optical output ports.

LO signals can be applied at the optical amplifiers' bias ports or carried into their optical input ports on optical signals which are then amplified and transported in optical fibers to the photodetectors which can be positioned at any desired site.

Another antenna array embodiment includes a plurality of optical amplifiers, a plurality of photodetectors which are coupled to detect optical signals at the optical amplifiers' optical output ports and an array of radiative antenna elements which are coupled to receive and radiate detected optical signals from the photodetectors. Intermediate-frequency signals are carried into optical input ports on optical signals and LO signals can be applied at the optical amplifiers' bias ports or also carried into optical input ports on optical signals.

Remote antenna system embodiments of the invention employ similar optical amplifier arrangements.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1A:
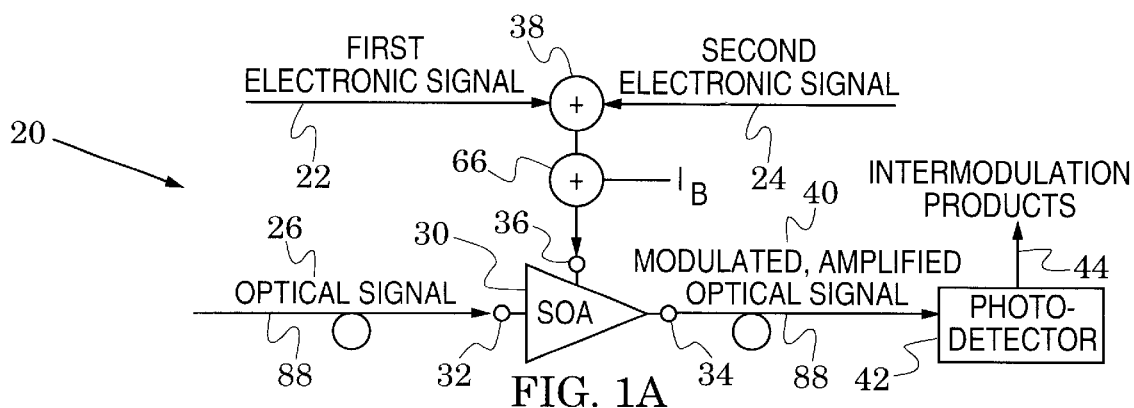
FIGS. 1A–1C are block diagrams which illustrate methods in accordance with the present invention for generating intermodulation products of electronic signals in optical carriers.
Figure 1B:
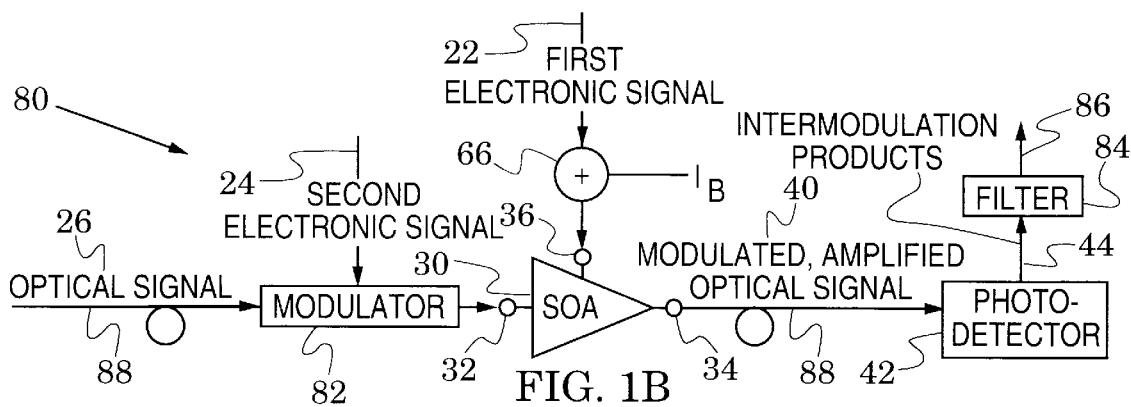
Figure 1C:
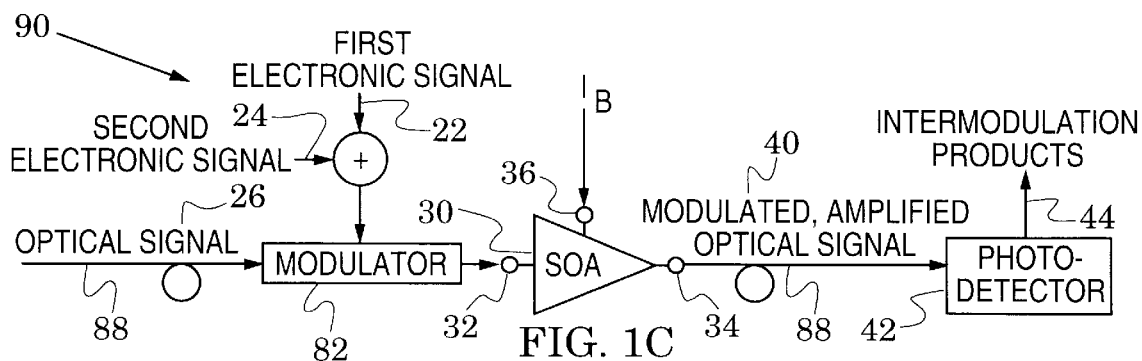

FIGS. 1A–1C illustrate mixing and modulating method embodiments of the invention. In particular, FIG. 1A is a block diagram 20 which illustrates a method of generating intermodulation products of first and second electronic signals 22 and 24 and inserting them into an optical carrier signal 26. The optical carrier signal 26 is amplified through an optical amplifier 30 which has a nonlinear transfer function between its optical input port 32 and its optical output port 34. The optical amplifier 30 is preferably an SOA whose junction is forward biased with a bias current $I_B$ that is applied through an amplifier bias port 36 ($I_B$ is typically on the order of 50 milliamps). The first and second electronic signals 22 and 24 are combined in an adder 38 and coupled to the bias port 36.

It has been found that the nonlinear transfer function causes an amplified optical signal 40 at the optical output port 34 to be modulated by the first and second electronic signals 22 and 24 and their intermodulation products. In response to the modulated, amplified optical signal 40, a photodetector 42 will, therefore, not only generate amplitude-scaled versions of the first and second electronic signals 22 and 24, but will also generate their intermodulation products at a photodetector output 44.

Figure 2:
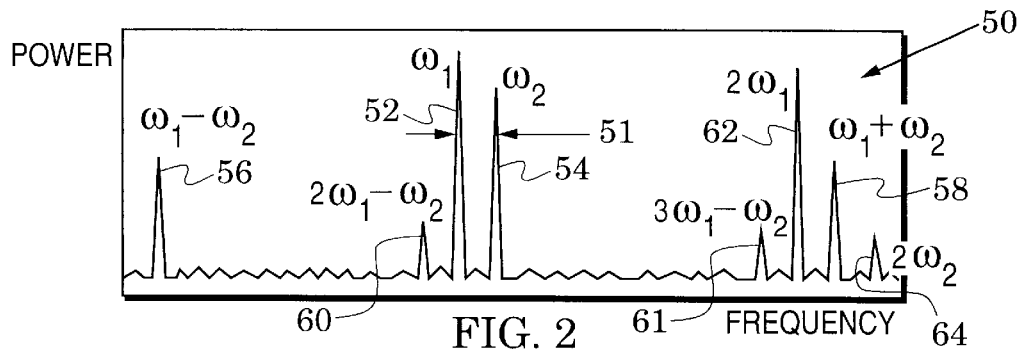
FIG. 2 is an graph which illustrates exemplary intermodulation products generated by the methods of FIGS. 1A–1C.

FIG. 2 illustrates an exemplary spectrum 50 at the photodetector output 44 when the first and second electronic signals 22 and 24 have angular frequencies $\omega_1$ and $\omega_2$ which differ by a delta frequency 51. The spectrum 50 includes amplitude-scaled versions 52 and 54 of the first and second electronic signals. The spectrum also includes a difference signal 56 having an angular frequency $\omega_1-\omega_2$, a sum signal 58 having an angular frequency $\omega_1+\omega_2$, a third order product 60 having an angular frequency $2\omega_1-\omega_2$, and a fourth-order product 61 having an angular frequency $3\omega_1-\omega_2$. In addition, the spectrum 50 has a second harmonic 62 (angular frequency $2\omega_1$) of the first electronic signal 22 and a second harmonic 64 (angular frequency $2\omega_2$) of the second electronic signal 24.

The process illustrated in FIG. 1A is especially suited for generating intermodulation products (e.g., signals 56, 58, 60 and 62 of FIG. 2) of radio frequency signals (e.g., microwave and millimeter-wave signals) in an optical carrier signal. In such applications, the adder 38 can be a conventional microwave or millimeter-wave power combiner and the bias current $I_B$ can be coupled through an adder 66 in the form of a conventional bias tee.

Another method of generating intermodulation products of first and second electronic signals in an optical carrier is shown in the block diagram 80 of FIG. 1B. FIG. 1B is similar to FIG. 1A with like elements indicated by like reference numbers. In this method, the first electronic signal continues to be coupled to the bias port 36 of the optical amplifier 30 but the second electronic signal 24 is introduced through the optical input port 32. In particular, the optical carrier signal 26 and the second electronic signal 24 are coupled respectively to an optical input port and a modulation port of an optical modulator 82. The amplitude modulated optical signal is then applied at the optical input port 32.

Intermodulation products of first and second electronic signals in an optical carrier can also be generated by a method which is shown in the block diagram 90 of FIG. 1C. FIG. 1C is similar to FIG. 1A with like elements indicated by like reference numbers. In this method, the first and second electronic signals are both coupled to the modulation port of the optical modulator 82 so that they modulate the optical carrier signal 26. The amplitude modulated optical signal is then applied at the optical input port 32.

Although the processes illustrated in FIGS. 1A–1C each generate somewhat different amplitudes of intermodulation products and harmonics, the spectrum 50 of FIG. 2 is representative of the spectrum at the photodetector output 44 for all three processes. The intermodulation products of FIG. 2 are exemplary ones only, other intermodulation products of these processes have amplitudes and/or frequencies which do not appear in the limited spectrum of FIG. 2. The signal levels shown are a function of the drive levels of the first and second electronic signals 22 and 24.

The structures of FIGS. 1A–1C are especially suited for converting the frequency of electronic signals. This is illustrated in FIG. 1B by the addition of a filter 84 that is connected to the output 44 of the photodetector 42. The filter 84 is configured to filter a selected intermodulation product from the composite detected signal at the photodetector output 44.

As a first example, the block diagram 80 represents an upconverter if the filter 84 is configured to pass only the sum signal 58, i.e., one of the first and second electronic signals 22 and 24 can be used to upconvert the other. As a second example, the block diagram 80 represents a downconverter if the filter 84 is configured to pass only the difference signal 56, i.e., one of the first and second electronic signals 22 and 24 can be used to downconvert the other.

In the processes of FIGS. 1A–1C, optical signal 26 and the modulated, amplified optical signal 40 are coupled to and from the optical amplifier 30 with optical fibers 88. Because of the low-loss nature of optical fibers, the optical amplifier 30 can be positioned remotely from other process elements, e.g., the photodetectors 42, the modulator 82 and laser sources, without incurring significant signal loss. These processes are preferably practiced with optical wavelengths at which optical fibers, optical amplifiers and laser sources are readily available, e.g., 1300 and 1550 nanometers.

Although any nonlinear optical amplifier can be used to practice the teachings of the invention, the semiconductor fabrication techniques for SOA's facilitate their integration into semiconductor chips of optoelectronic systems.

However, if polarization-dependent optical amplifiers are used, the interconnecting optical fibers must be expensive polarization-maintaining optical fibers. Costs can be considerably reduced (especially for long runs of fibers) if the teachings of the invention are practiced with polarization-insensitive SOA's. An exemplary polarization-insensitive SOA is described in Newirk, M. A., et al., "1.5 um Multiquantum-Well Semiconductor Optical Amplifier with Tensile and Compressively Strained Wells for Polarization-Independent Gain", *IEEE Photonics Letters*, Vol. 4, No. 4, April, 1993.

An exemplary photodetector for use in FIGS. 1A–1C is a PIN photodiode and an exemplary optical modulator is a directional coupler or Mach-Zehnder modulator formed with optical waveguides diffused into a lithium niobate substrate.

Figures 3, 4:
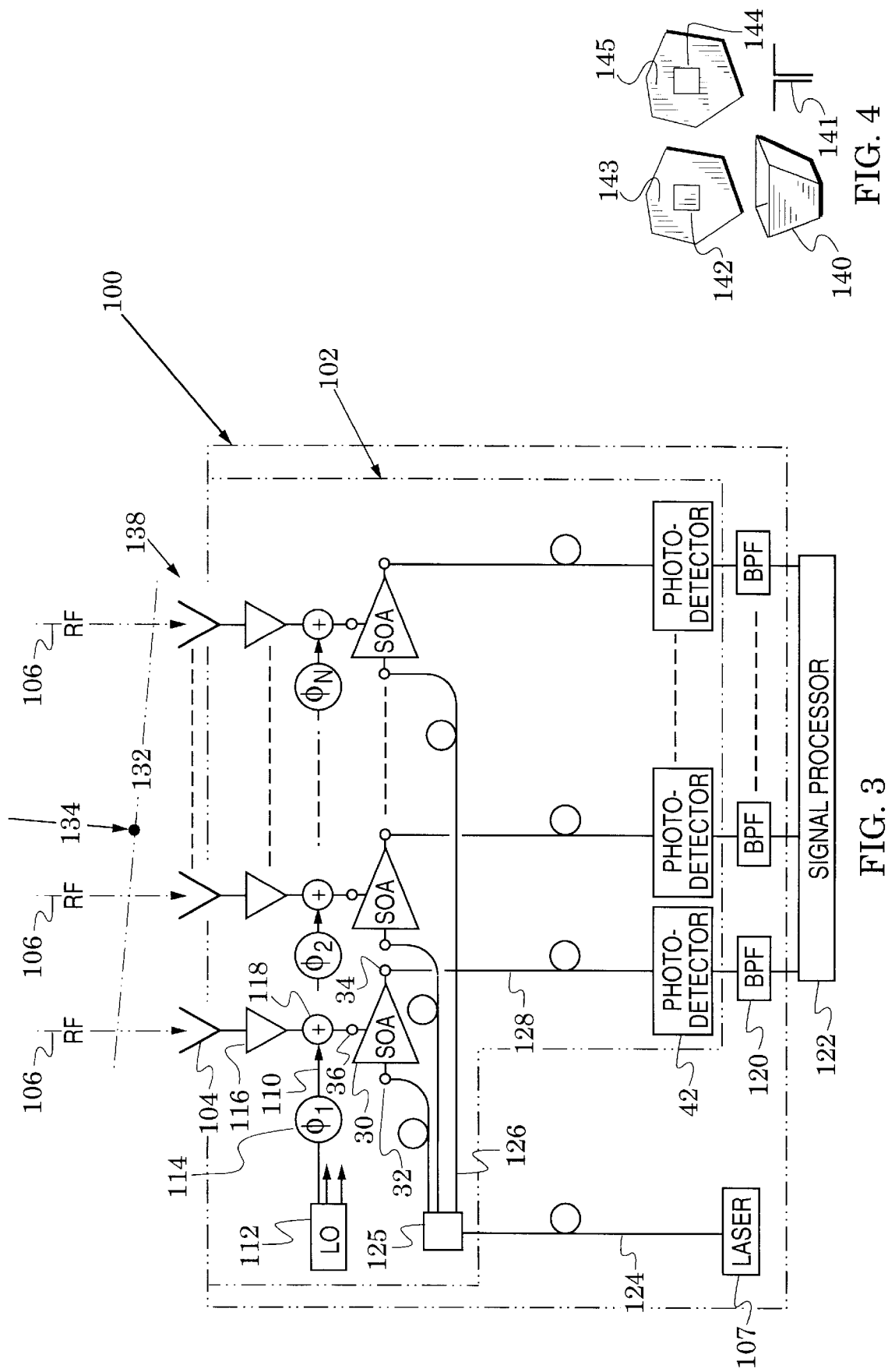
FIG. 3 is a block diagram of a phased-array receiving antenna whose operation includes the intermodulation generating method of FIG. 1A.
FIG. 4 is a view of various conventional antenna elements for use in the phased-array antenna of FIG. 3.

FIGS. 3–6 illustrate phased-array antenna embodiments of the invention. In particular, FIG. 3 illustrates a phased-array receiving antenna 100 whose operation includes the intermodulation generating process illustrated in FIG. 1A. The phased-array antenna 100 has an antenna array 102 which includes an array of receptive elements 104 that are each configured to receive a portion 106 of a radio-frequency signal. The antenna array also includes a plurality of the optical amplifiers 30 and a plurality of the photodetectors 42 of FIGS. 1A–1C. Each of the optical amplifiers 30 has its bias port 36 coupled to a respective one of the receptive elements 104 to receive its radio-frequency signal portion 106. Each of the photodetectors 42 is coupled to the optical output port 34 of a respective one of the optical amplifiers 30.

In the antenna array 102, each of the optical amplifiers 30 provides an optical input port 32 for insertion of an optical signal from a laser 107. The optical signal is modulated by the radio-frequency signal portion 106 that is received at that optical amplifier's bias port 36. This amplified and modulated optical signal is then detected by the photodetector 42 at that optical amplifier's optical output port 34 to recover the radio-frequency signal portion 106.

Each of the optical amplifiers 30 of the antenna array 102 also provides an optical input port 32 and a bias port 36 for insertion at either of a local oscillator signal for frequency converting that optical amplifier's radio-frequency signal portion 106. In the phased-array antenna 100, the local oscillator signal is generated by a local oscillator signal generator 112 and this signal is coupled to each of the bias ports 36 through a respective phase shifter 114.

The radio frequency portion 106 from each receptive element 104 is amplified by a radio-frequency low-noise amplifier 116 and this amplified signal is combined with the phase-shifted local oscillator signal 110 in a conventional radio-frequency combiner 118. Preferably, the transmission lines coupling the local oscillator generator 112 to the combiners 118 form a corporate feed, i.e., they have equal lengths.

The detected radio-frequency output from the photodetectors 42 is filtered by bandpass filters 120 and coupled into a signal processor 122 for a variety of conventional processing steps (e.g., further downconversion and amplification followed by demodulation to recover information content).

The optical signal from the laser 107 is coupled to the optical input ports 32 of the optical amplifiers 30 by a primary optical fiber 124, an optical fiber splitter 125 (e.g., a fused biconical taper coupler) and a plurality of secondary optical fibers 126. The amplified and modulated optical signals at the optical output ports 34 of the optical amplifiers 30 are coupled to the photodetectors 42 by optical fibers 128.

In operation of the phased-array antenna 100, the radio-frequency signal portions 106 and the phase shifted local oscillator signals 110 are coupled into the bias ports 36 of the optical amplifiers 30. The phase shifts (e.g., $\phi_1, \phi_2, - - - \phi_N$) of the phase shifters 114 are selected to create an effective receive phase front 132 in the radio-frequency signal portions 106. Thus, the phased-array antenna 100 will have its receive pattern steered along a beam axis 134 which is orthogonal to the phase front 132. With appropriate selection of the phase shifts of the phase shifters 114, the receive pattern can be steered in selected directions. All of the optical fibers 128 preferably have the same length to maintain the antenna phasing.

Space is typically limited in the region of the antenna aperture 138. Thus, although the photodetectors 42 are functionally part of the antenna array 102, they may also be positioned along with the laser 107, the bandpass filters 120 and the signal processor 122 at a remote location. In a large shipboard phased-array antenna, for example, this remote location would typically be below decks and only the other portions of the antenna array 102 would be positioned in an exposed location. The modulating processes of the invention permit these separate locations to be coupled together with low-loss optical fibers, e.g., the fibers 124 and 128.

The operational frequency band of the phased-array antenna 100 can be at a wide range of radio-frequencies, e.g., microwave frequency or millimeter-wave frequency. An exemplary set of frequencies is 24 GHz for the radio-frequency signal portions 106 (the portions of the received antenna beam) and 22 GHz for the local oscillator signal 110. In this exemplary frequency design, the difference frequency 56 in FIG. 2 would be 2 GHz. The bandpass filters 120 of FIG. 3 would be designed to pass this downconverted signal 56 on to the signal processor 122 for further processing.

The process illustrated in FIG. 1A can therefore be used to provide a convenient intermediate frequency for further processing in the signal processor 122 of FIG. 3. It is difficult and expensive to build photodetectors that demodulate very high modulation frequencies, e.g., >20 GHz. By downconverting the modulation to lower frequencies, the process of FIG. 1A also relaxes the frequency requirements of photodetectors.

Figure 5:
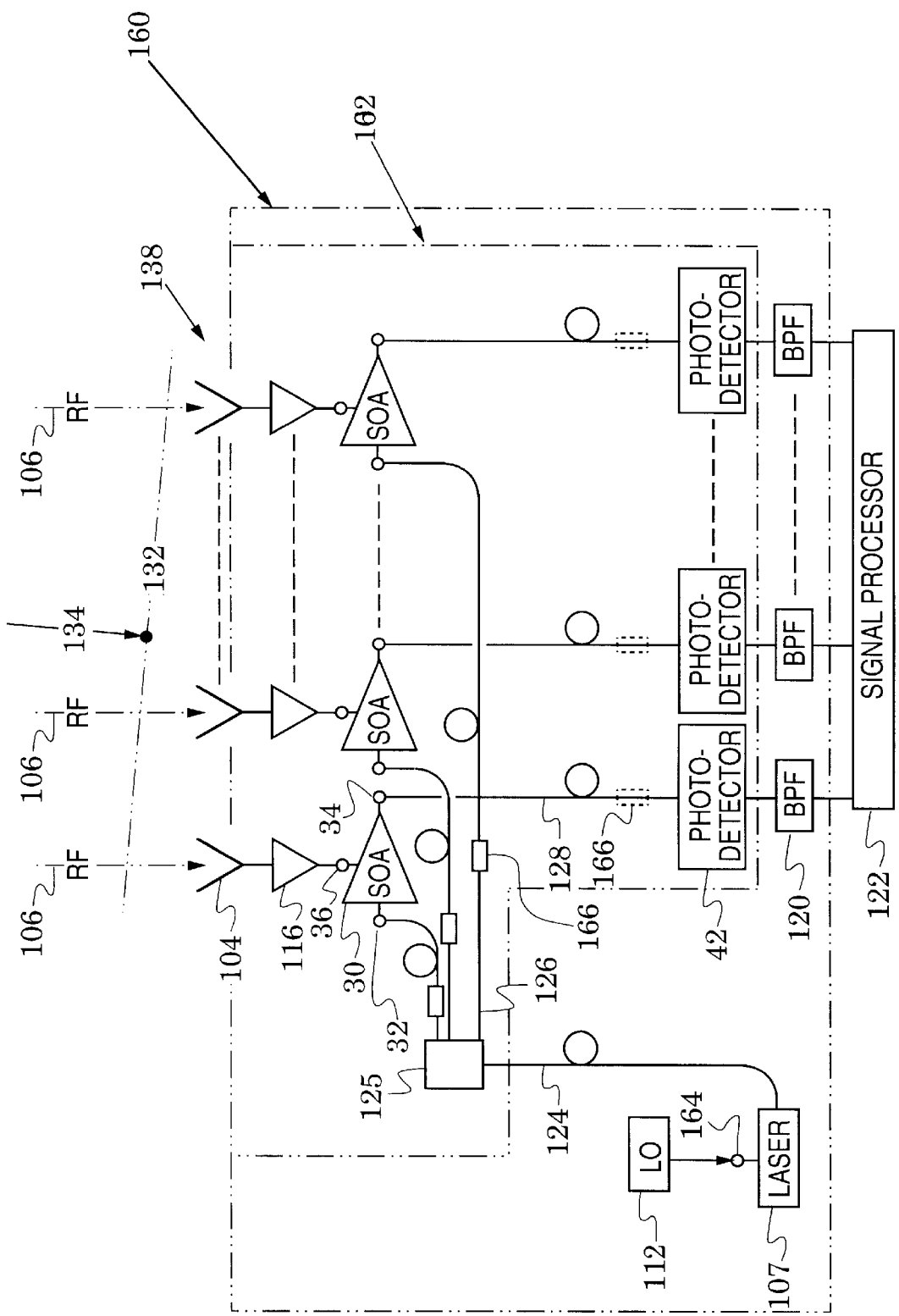
FIG. 5 is a block diagram of a phased-array receiving antenna whose operation includes the intermodulation generating method of FIG. 1B.

FIG. 5 illustrates a phased-array receiving antenna 160 (and an antenna array 162) whose operation includes the intermodulation generating process illustrated in FIG. 1B. FIG. 5 is similar to FIG. 3 with like elements indicated by like reference numbers. In FIG. 5, however, the local oscillator 112 couples its local oscillator signal into a bias port 164 of the laser 107. Alternatively, the laser's optical signal could be modulated as shown in FIG. 1B, i.e., by coupling the local oscillator signal 110 into an optical modulator 82 which is driven by the laser 107.

In addition, the radio-frequency phase shifters 114 of FIG. 3 are replaced by optical time-delay systems 166 which are positioned in each secondary optical fiber 126. Various conventional optical time-delay systems can be used. An exemplary one includes a plurality of optical waveguides which have different path lengths. These different path lengths are selected with optical switches, e.g., directional coupler switches. The different path lengths introduce different time delays (hence, phase delays of the local oscillator modulation) into the secondary optical fibers 126 (and into the frequency-converted signals in the optical fibers 128). The secondary optical fibers 126 would typically be structured to form a corporate feed to the optical amplifiers 30, i.e., their physical lengths would be equal.

In operation of the phased-array antenna 160, the radio-frequency signal portions 106 are coupled into the bias ports 36 of the optical amplifiers 30 and phase shifted local oscillator signals are coupled into the optical input ports 32 of the optical amplifiers 30.

Alternatively, the receive direction 134 of the antenna 160 can be steered by moving the optical time-delay systems 166 to the output optical fibers 128 (as indicated by broken lines). Various other steering embodiments can be formed. For example, the laser 107 can be coupled by separate optical fibers to each optical amplifier 30. An optical modulator (e.g., modulator 82 of FIG. 1B) can be coupled into each of these optical fibers and the phase shifted signals 110 of FIG. 3 can be coupled to these optical modulators. Of course, antenna steering can also be accomplished with selective phase shifts applied in the signal processor 122 to the outputs of the bandpass filters 120.

Figure 6:
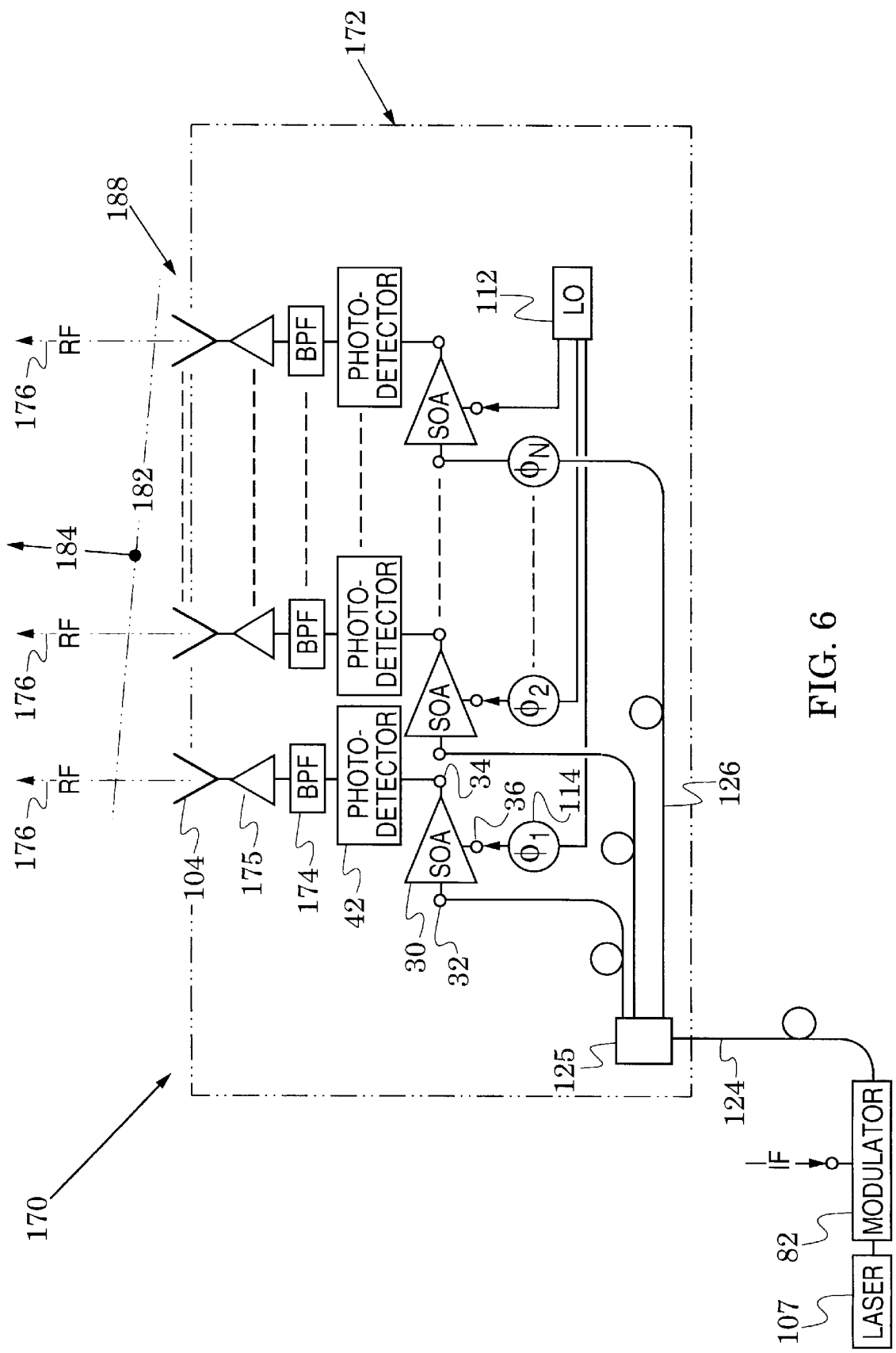
FIG. 6 is a block diagram of a phased-array transmitting antenna whose operation includes the intermodulation generating method of FIG. 1B.

FIG. 6 illustrates a phased-array transmitting antenna 170 (and an antenna array 172) whose operation includes the intermodulation generating process illustrated in FIG. 1B. FIG. 6 is similar to FIG. 3 with like elements indicated by like reference numbers. In the antenna 170, the receptive elements 104 are used as radiative elements. As is well known, antenna elements have the property of reciprocity, i.e., the characteristics of an antenna element are the same whether it is transmitting or receiving. An antenna element which has a particular receive pattern inherently has the same radiative pattern.

The low noise receive amplifiers 116 are replaced by bandpass filters 174 and transmitting power amplifiers 175 and the outputs of the photodetectors 42 are coupled to the bandpass filters 174. The optical modulator 82 (of FIG. 1B) is positioned in the primary optical fiber 124 to receive the output of the laser 107. The secondary optical fibers 126 preferably form a corporate feed, i.e., they have equal lengths. These lengths were not of concern in FIG. 3 because the optical signal did not carry a modulation. The local oscillator 112 continues to be coupled to the bias ports 36 of the optical amplifiers 30 by a plurality of phase shifters 114.

In operation of the phased-array transmitting antenna 170, a radio-frequency signal (typically referred to as an intermediate frequency or IF) is inserted into the modulating port of the modulator 82. In each optical amplifier 30, this IF signal mixes with a local oscillator signal from the local oscillator signal generator 112. A modulated and amplified optical signal from each optical amplifier 30 is detected by its respective photodetector 42. One of the intermodulation products, e.g., the sum signal 58 of FIG. 2, is passed through a respective bandpass filter 174. This signal is amplified by a respective power amplifier 175 and radiated by a respective radiative element 104 as a transmitted signal portion 176.

The phase shifts (e.g., $\phi_1, \phi_2, - - - \phi_N$) of the phase shifters 114 are selected to create an effective transmit phase front 182 so that the total transmitted power will have a transmit pattern steered along a beam axis 184 which is orthogonal to the phase front 182. With appropriate selection of the phase shifts of the phase shifters 114, the transmit pattern can be steered in selected directions.

The structure of the antenna 170 permits the elements of the antenna array 172 to be positioned adjacent an antenna aperture 188 and other elements, e.g., the laser 107 and the modulator 82, can be positioned remotely and connected to the array by the low-loss primary optical fiber 124.

Figure 7:
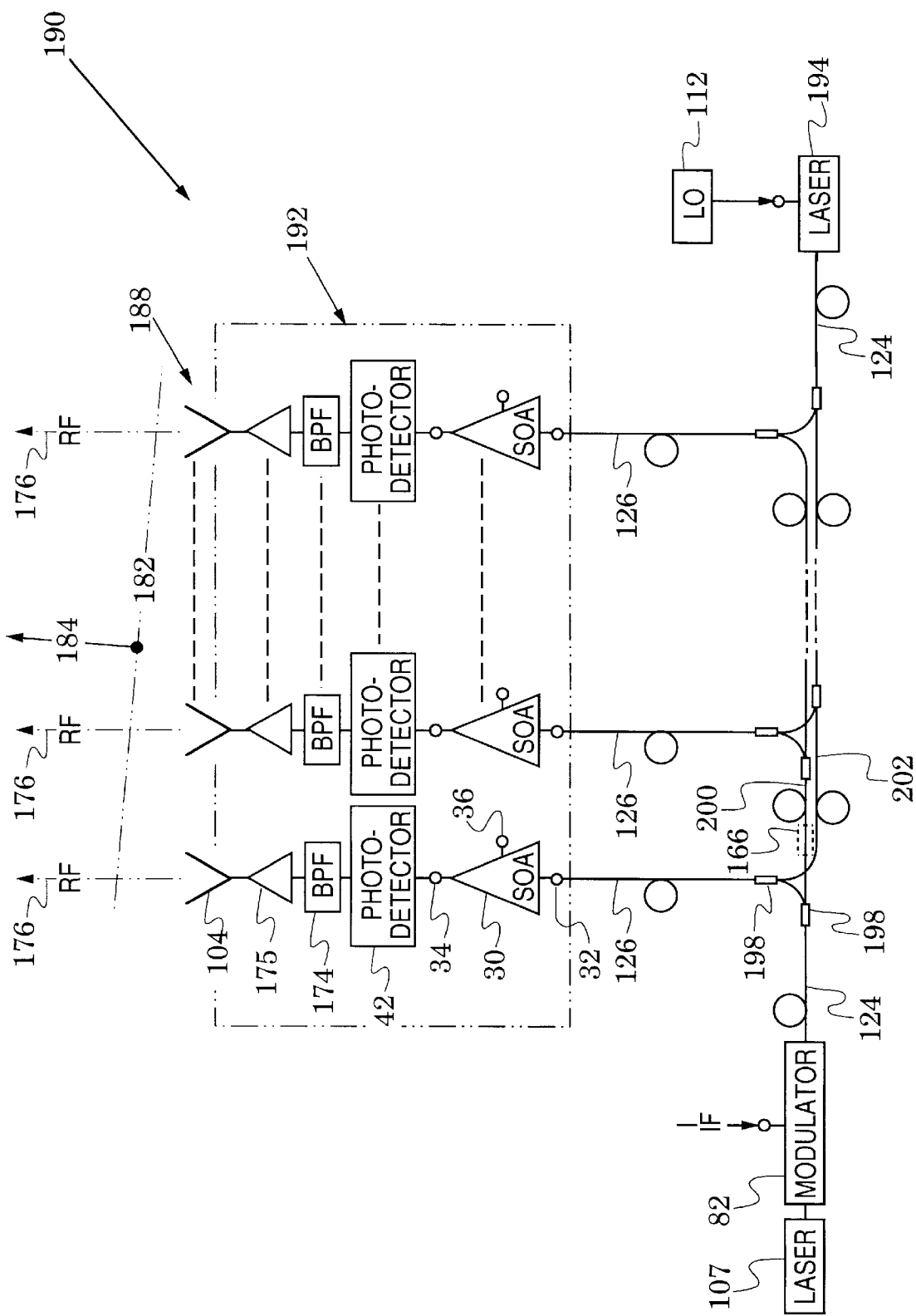
FIG. 7 is a block diagram of a phased-array transmitting antenna whose operation includes the intermodulation generating method of FIG. 1C.

FIG. 7 illustrates a phased-array transmitting antenna 190 (and an antenna array 192) whose operation includes the intermodulation generating process illustrated in FIG. 1C. FIG. 7 is similar to FIG. 6 with like elements indicated by like reference numbers.

In contrast with FIG. 6, another laser 194 has been added and the local oscillator signal generator 112 has been coupled to a bias port of this laser. A plurality of optical combiners 198 and optical time-delay fibers are used to couple the lasers 107 and 194 to the secondary optical fibers 126. The optical time-delay fibers are arranged to introduce a predetermined time delay into the optical signals (hence, a predetermined phase delay of modulation carried by these signals).

For example, a time-delay fiber 200 introduces a predetermined time delay between two adjacent secondary optical fibers 126 of the optical signal from the laser 107. Similarly, a time-delay fiber 202 introduces a predetermined time delay between two adjacent secondary optical fibers 126 of the optical signal from the laser 194.

When operating the phased-array transmitting antenna 190, an IF signal is inserted into the modulating port of the modulator 82 and a local oscillator signal is inserted into the bias port of the laser 194. These signals are carried to the optical amplifiers 30. A modulated and amplified optical signal from each optical amplifier 30 is detected by its respective photodetector 42. One of the intermodulation products, e.g., the sum signal 58 of FIG. 2, is passed through a respective bandpass filter 174. This signal is amplified by a respective power amplifier 175 and radiated by a respective radiative element 104 as a transmitted signal portion 176.

The predetermined time delays of the time-delay optical fibers 200 and 202 can be selected in a conventional manner to create the effective transmit phase front 182 so that the total transmitted power from the radiative elements 104 will have a transmit pattern steered along a beam axis 184 which is orthogonal to the phase front 182. The fixed time-delay fibers 200 and 202 cause the beam axis 184 to have a fixed direction. This direction can be selected by introducing the optical time-delay systems 166 (of FIG. 5) into one of the time-delay fibers 200 and 202 (as indicated by broken lines).

Alternatively, the time delays of optical fibers 200 and 202 can be fixed and the local oscillator and IF frequencies varied to steer the beam axis 184 at a fixed transmitted frequency. For example, if the time delays of the optical fibers 200 and 202 are equal and the sum frequency is to be transmitted, the local oscillator and IF frequencies can be varied in a coordinated way so that their sum is constant and equal to the desired transmitted frequency. The phase between antenna elements 104 will then vary as the difference between the local oscillator and IF frequencies which allows the beam to be steered in angle. This method of antenna steering was taught in U.S. Pat. No. 3,090,928 issued to Welty, W. R. in - - - 1963 and assigned to Hughes Electronics, the assignee of the present invention. It is more effectively implemented with the teachings of the present invention. Fewer parts are required because the optical amplifier provides both mixing and amplification functions and optical fibers facilitate broadband, low loss antenna operation.

Figure 8:
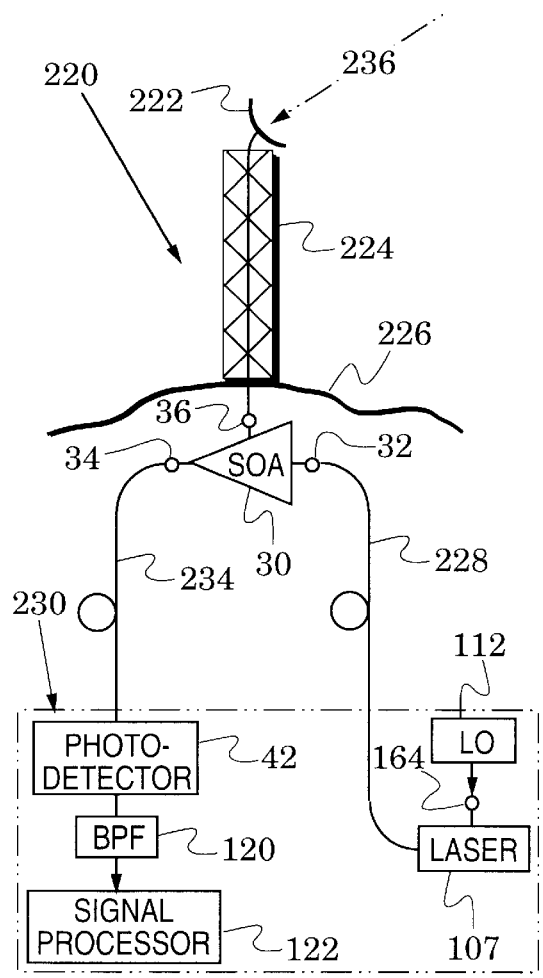
FIG. 8 is a block diagram of a remote receiving antenna system whose operation includes the intermodulation generating method of FIG. 1B.
Figure 9:
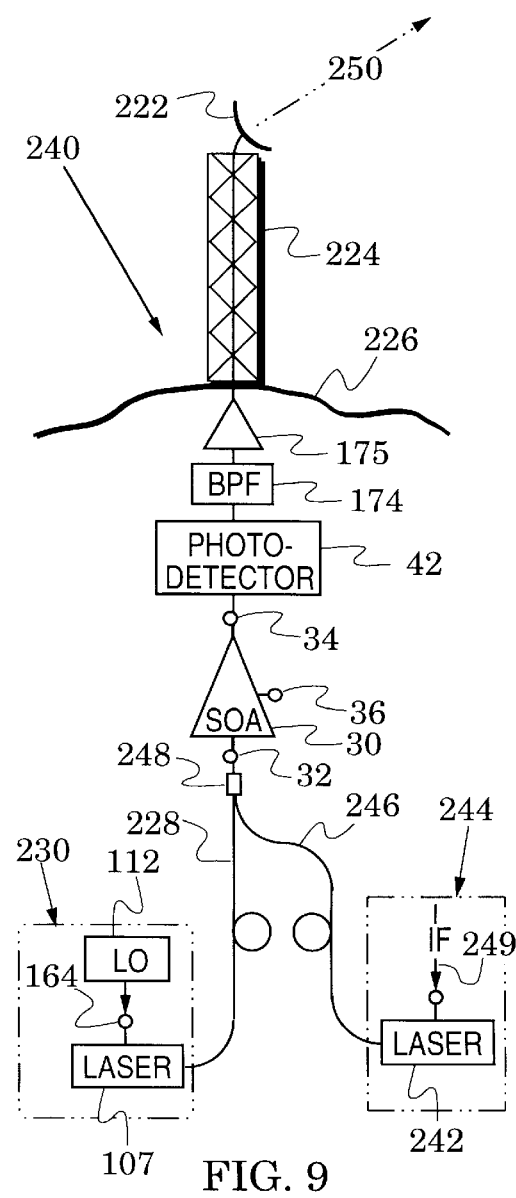
FIG. 9 is a block diagram of a remote transmitting antenna system whose operation includes the intermodulation generating method of FIG. 1C.

FIGS. 8 and 9 illustrate remote antenna system embodiments of the invention. In particular, FIG. 8 illustrates a remote antenna system 220 whose operation includes the intermodulation generating process illustrated in FIG. 1B. An optical amplifier 30 (see FIG. 1B) has its bias port 36 connected to an antenna 222 which is positioned on a tower 224 at a remote location, e.g., a mountain peak 226. The optical amplifier's optical input port 32 is connected by an optical fiber 228 to a laser 107 (see FIG. 3) which is located at a signal processing site 230. A local oscillator signal generator 112 (see FIG. 5) is connected to a bias port 164 of the laser 107. A series arrangement of a photodetector 42, a bandpass filter 120 and a signal processor 122 (see FIG. 3) is also positioned at the signal processing site 230 and connected to the optical amplifier's optical output port 34 by an optical fiber 234.

In operation of the system 220, an optical signal from the laser 107 is modulated by a local oscillator signal from the local oscillator signal generator 112. This modulated signal is coupled to the optical input port of the optical amplifier 30 and a received radio-frequency signal 236 (from a communication satellite, for example) is coupled from the antenna 222 to the optical amplifier's bias port 36. This generates an amplified, modulated laser signal that is coupled from the optical amplifier's optical output port 34 to the photodetector 42 which recovers a spectrum similar to that of FIG. 2. An intermodulation product (e.g., the difference signal 56 of FIG. 2) is filtered through the bandpass filter 120 and sent to the signal processor 122 for processing. If desired, a low-noise amplifier can be positioned between the antenna 222 and the optical amplifier's bias port 36.

The system 220 couples the remote antenna 222 and the processing site 230 with low-loss optical fibers and eliminates the need for radio-frequency mixing structures at the remote site 226. In cases in which the received signal 236 is above the frequency range of typical photodetectors, e.g., >20 GHz, the system 220 can downconvert the received signal 236 to a difference frequency that is in the photodetector's range.

FIG. 9 illustrates a remote antenna system 240 whose operation includes the intermodulation generating process illustrated in FIG. 1C. FIG. 9 is similar to FIG. 8 with like elements indicated by like reference numbers. However, the optical amplifier 30 now has its optical output port 34 connected through a serial arrangement of the photodetector 42, a bandpass filter 174 and a power amplifier 175 (see FIG. 7) to the antenna 222. Another laser 242 is located at another signal processing site 244 that is removed from the signal processing site 230 and from the remote site 226. The laser 242 is also coupled to the optical amplifier's optical input port 32 through an optical fiber 246 and an optical combiner 248.

In operation of the system 240, an IF signal 249 modulates the laser signal of the laser 242 and this signal mixes in the optical amplifier 30 with the local oscillator signal from the local oscillator signal generator 112. The intermodulation products are detected by the photodetector 42, filtered by the bandpass filter 174 to pass a selected product, e.g., the sum signal 58 of FIG. 2. This selected intermodulation product is amplified by the power amplifier 175 and radiated from the antenna as an antenna beam 250. In this system, the frequency of the radiated signal 250 at a transmitting site 226 can be controlled from either of the distant processing sites 230 and 244.

Figure 10:
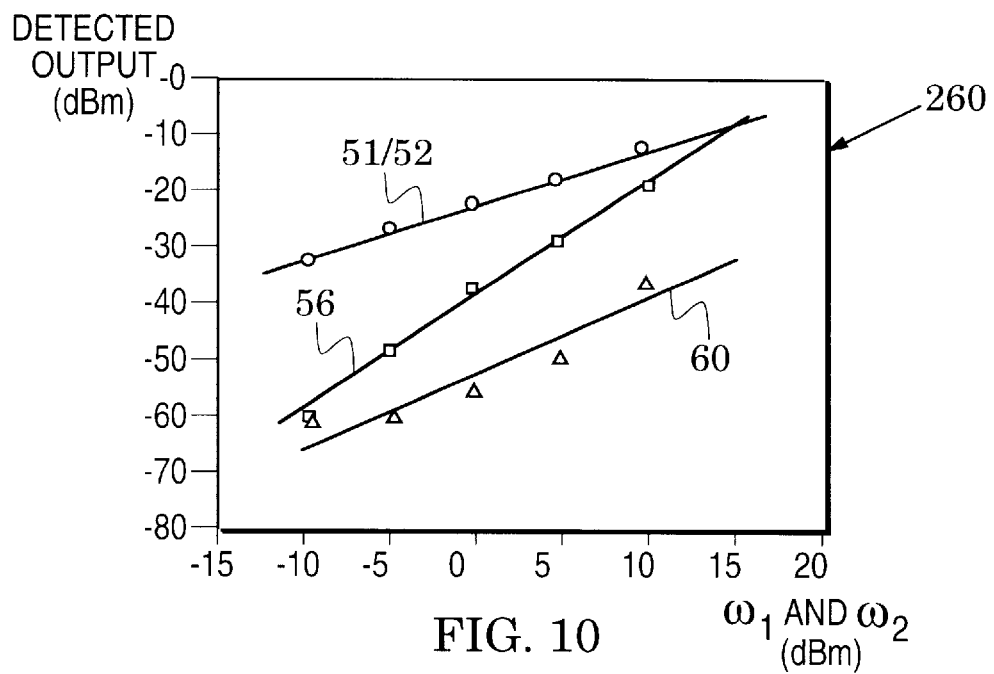
FIGS. 10 and 11 are graphs which show exemplary test results for the mixing and modulating methods of FIGS. 1A–1C.

The methods shown in FIGS. 1A–1C for generating intermodulation products were tested in exemplary laboratory setups. The general spectrum of these products is illustrated in FIG. 2. Specific product levels obtained in one test of the process of FIG. 1A are shown in the graph 260 of FIG. 10. The horizontal graph axis indicates power levels applied to the bias port 36 of the optical amplifier 30 of FIG. 1A and the vertical graph axis indicates detected powers at the output 44 of the photodetector 42. Although the test was conducted with an available polarization-sensitive SOA (Hewlett Packard 3100–1550), its results are representative of the performance of polarization-sensitive SOA's.

In this test, the laser signal wavelength was 1540 nanometers, input power to the SOA was −20 dBm and the SOA's optical gain was 5.9 dB. The first and second electronic signals 22 and 24 of FIG. 1A were set with angular frequencies $\omega_1$ and $\omega_2$ equal to 490 MHz and 510 MHz respectively. The levels of the detected signals 51 and 52 of FIG. 2 are shown as plot 51/52. The detected difference signal 56 and third-order intermodulation signal 60 are shown as plots 56 and 60 respectively.

For small input values of the first and second electronic signals 22 and 24, the intermodulation products are reduced (e.g., ~25 dB) indicating that the SOA is particularly useful as a modulator in this region, i.e., modulating the optical carrier with one of the first and second electronic signals 22 and 24. For larger input values of the first and second electronic signals 22 and 24, the intermodulation products rise (e.g., the difference signal 60 approaches the signals 51 and 52) indicating that the SOA is particularly useful as an intermodulation product generator in this region.

Figure 11:
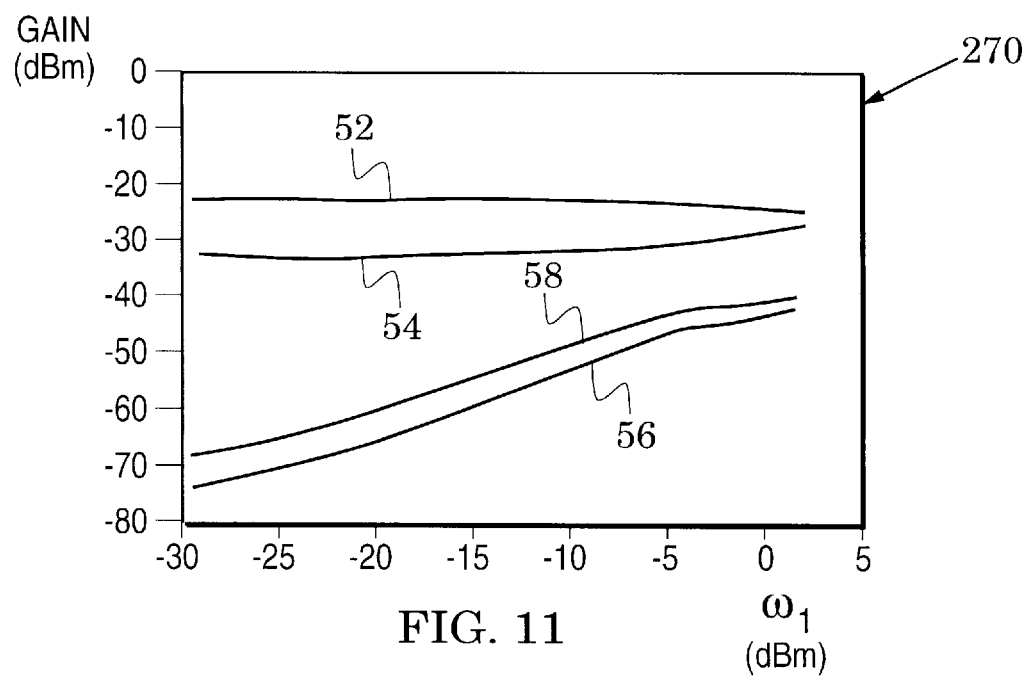

Link and conversion gains obtained in one test of the process of FIG. 1B are shown in the graph 270 of FIG. 11. The first and second electronic signals 22 and 24 of FIG. 1B were set with angular frequencies $\omega_1$ and $\omega_2$ equal to 250 MHz and 230 MHz respectively. The first electronic signal 22 was applied to the bias port of a semiconductor optical amplifier and the second electronic signal 24 was applied to the bias port of a laser operating at a wavelength of 1541.5 nanometers (application of the second electronic signal is in contrast to FIG. 1B in which it is applied to a modulator 82).

The horizontal graph axis indicates different signal levels of the second electronic signal 24. Plot 56 indicates the conversion gain of the difference signal having a frequency of $\omega_1-\omega_2$ and plot 58 indicates the the conversion gain of the sum signal having a frequency of $\omega_1+\omega_2$. These conversion gains are shown as a function of the signal level of the second electronic signal 24 as the level of the first electronic signal 22 was held constant at −20 dBm. The conversion gains increase linearly with the signal level of the second electronic signal 24 until they plateau in the region of −45 dB for signal levels (of the second electronic signal 24) above ~−4 dBm. To facilitate correlation with the signals of FIG. 2, these plot reference numbers are the same as those for the difference and sum signals of FIG. 2.

Plot 52 indicates the link gain of the first electronic signal 22 and plot 54 indicates the link gain of the second electronic signal 24. For correlation, these plot reference numbers are the same as those for the first electronic signal ($\omega_1$), and second electronic signal ($\omega_2$) of FIG. 2.

It is theorized that the basic principle of the methods of the invention follow from the behavior of the optical gain as a function of the input RF drive and optical power of an SOA. Given an input RF drive I(t) and a DC current $I_o$, the response of the SOA to an optical power P(t) is given by the rate equation $$\frac{dN}{dt} + \frac{N}{\tau}\left(1 + \frac{P(t)}{P_{sat}}\right) = \frac{I_o + I(t)}{qV} + \frac{N_o P(t)}{\tau P_{sat}}$$

in which N is the carrier density of the electrons in the conduction band, $\tau$ is the upper laser state lifetime, q is the electron charge, V is the volume of the gain medium and $P_{sat}$ is the SOA's saturation power. In the regime where P(t) $<<P_{sat}$, the rate equation has a solution $$N(t) = \frac{I_o \tau}{qV} + \frac{1}{qV}\left\{\frac{1/\tau}{(1/\tau)^2 + \Omega^2} I(t) + \frac{\Omega}{(1/\tau)^2 + \Omega^2} I\left(t, \frac{\pi}{2}\right)\right\}$$

in which I(t,$\pi$/2) is the quadrature component of I(t) and $\Omega$ is the frequency of oscillation of I(t).

The SOA gain is given by G(t)=a{N(t)−$N_o$} in which a is the differential gain and $N_o$ is the transparency density. The gain G(t) is used in this expression for the optical polarization density which acts as a source in Maxwell's equations. Using the slowly varying envelope approximation, one obtains a well-known solution $$T(t) \equiv \left|\frac{E_{out}}{E_{in}}\right|^2 = e^{Gz}e^{\delta G[I(t)]z}.$$

The following conclusions can be drawn:

(1) If the amplitude of the RF drive is small enough, the time-dependent term in the exponential function can be approximated by a series $1+x+0.5x^2+0.25x^3$ in which x=$\delta$Gz. The degree of linearity of the device is determined by the relative magnitude of the second and third order terms with respect to the fundamental. Hence, in addition to the fundamental signal, SOA's are capable of generating higher order harmonics and intermodulation signals of the form of $$\frac{2^{nd}\text{ order}}{\text{Fundamental}} = \frac{1}{2}\delta Gz$$

and $$\frac{3^{nd}\text{ order}}{\text{Fundamental}} = \frac{1}{4}(\delta Gz)^2.$$

(2) If the amplitude of the RF drive becomes large, then the time dependent term in the exponential is such that a series expansion will become inaccurate. In this case, higher order terms can play an important role in the process of frequency conversion. The relative order of magnitude can then be found by a Fourier filtering process. For example, the difference frequency term becomes $$2^{nd}\text{ order term} = \int_{-\infty}^{+\infty} T(t)e^{i(\omega_1-\omega_2)t}dt.$$

Hence, an appropriate choice of input physical parameters such as optical power, RF drive current and RF frequencies will permit the enhancement of selective nonlinear modulation terms for specific applications.

Modulation methods and structures have been shown in which nonlinear optical amplifiers generate intermodulation products of radio-frequency signals in an optical carrier without the penalty of an optical conversion loss and without the need for radio-frequency mixers, electro-optic modulators and expensive polarization-maintaining optical fibers. SOA's can be used as the nonlinear optical amplifiers to facilitate integration with other system structures on semiconductor chips. In addition, the use of polarization-insensitive SOA's avoids the cost of polarization-maintaining optical fibers. Nonlinear optical amplifiers can be easily integrated into optoelectronic systems because electronic signals can be coupled into either their bias ports or their optical input ports.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of generating intermodulation products of a plurality of electronic signals in an optical carrier signal, comprising the steps of:
    amplifying said optical carrier signal through an optical amplifier which has a bias port and a nonlinear transfer function between an optical input port and an optical output port;
    coupling a first one of said electronic signals into a selected one of said bias port and said optical input port; and
    coupling a second one of said electronic signals into a selected one of said bias port and said optical input port to facilitate the generation of said intermodulation products in said optical carrier signal at said optical output port by said nonlinear transfer function.

2. The method of claim 1, wherein said first and second electronic signals are coupled into said bias port.

3. The method of claim 1, wherein said first and second electronic signals are coupled into said optical input port.

4. The method of claim 1, wherein said first electronic signal is coupled into said optical input port and said second electronic signal is coupled into said bias port.

5. The method of claim 1, wherein said first electronic signal is coupled into said optical input port and said first electronic signal coupling step includes the steps of:
    modulating said optical signal with said first electronic signal to obtain a modulated optical signal; and
    coupling said modulated optical signal into said optical input port.

6. The method of claim 1, wherein said optical amplifier is a semiconductor optical amplifier.

7. The method of claim 6, wherein said optical amplifier is a polarization-insensitive semiconductor optical amplifier.

8. The method of claim 1, wherein said first and second electronic signals are microwave signals.

9. The method of claim 1, wherein said first and second electronic signals are millimeter-wave signals.

10. A method of frequency converting a first electronic signal with a second electronic signal, comprising the steps of:
    coupling said first electronic signal into a selected one of a bias port and an optical input port of an optical amplifier which has a nonlinear transfer function between said optical input port and an optical output port;
    coupling said second electronic signal into a selected one of said bias port and said optical input port;
    amplifying an optical signal through said optical amplifier to obtain an amplified, modulated optical signal at said optical output port which includes intermodulation products of said first and second electronic signals; and
    detecting said amplified, modulated optical signal to recover said intermodulation products which each represent a frequency converted version of said first electronic signal.

11. The method of claim 10, further including the step of filtering a selected one of said intermodulation products away from the others of said intermodulation products.

12. The method of claim 10, wherein said first and second electronic signals are coupled into said bias port.

13. The method of claim 10, wherein said first and second electronic signals are coupled into said optical input port.

14. The method of claim 10, wherein said first electronic signal is coupled into said optical input port and said second electronic signal is coupled into said bias port.

15. The method of claim 10, wherein said first electronic signal is coupled into said optical input port and said first electronic signal coupling step includes the steps of:
    modulating said optical signal with said first electronic signal to obtain a modulated optical signal; and
    coupling said modulated optical signal into said optical input port.

16. The method of claim 10, wherein said optical amplifier is a semiconductor optical amplifier.

17. The method of claim 10, wherein said optical amplifier is a polarization-insensitive semiconductor optical amplifier.

18. The method of claim 10, wherein said electronic signals are microwave signals.

19. The method of claim 10, wherein said electronic signals are millimeter-wave signals.

20. An antenna array for receiving a radio-frequency signal, comprising:
    an array of receptive elements which are each configured to receive a portion of said radio-frequency signal;
    a plurality of optical amplifiers, each having a nonlinear transfer function between an optical input port and an optical output port and each having a bias port coupled to a respective one of said receptive elements to receive its radio-frequency signal portion; and
    a plurality of photodetectors, each coupled to detect an optical signal from the optical output port of a respective one of said optical amplifiers;
    each of said optical amplifiers providing an optical input port for insertion of an optical signal which is modulated by the radio-frequency signal portion at that optical amplifier's bias port and detected by the photodetector at that optical amplifier's optical output port to recover the radio-frequency signal portion; and
    each of said optical amplifiers providing an optical input port and a bias port for insertion at either port of a local oscillator signal for frequency converting that optical amplifier's radio-frequency signal portion.

21. The antenna array of claim 20, wherein each of said receptive elements is a receptive horn.

22. The antenna array of claim 20, wherein each of said receptive elements is a receptive patch.

23. The antenna array of claim 20, wherein each of said receptive elements is a metallic member which forms a receptive aperture.

24. The antenna array of claim 20, wherein each of said receptive elements is a receptive dipole.

25. The antenna array of claim 20, wherein said optical amplifiers are semiconductor optical amplifiers.

26. The antenna array of claim 25, wherein said semiconductor optical amplifiers are polarization-insensitive semiconductor optical amplifiers.

27. The antenna array of claim 20, further including:
    an optical signal generator coupled to the optical input ports of said optical amplifiers; and
    a local oscillator signal generator coupled to the bias ports of said optical amplifiers.

28. The antenna array of claim 27, further including a plurality of radio-frequency phase shifters which are each coupled between said local oscillator signal generator and the bias port of a respective one of said optical amplifiers for selecting the phase of a local oscillator signal portion received by that optical amplifier.

29. The antenna array of claim 20, further including:
   an optical signal generator coupled to the optical input ports of each of said optical amplifiers; and
   a plurality of optical time-delay modules with each coupled between said optical signal generator and the optical input port of a respective one of said optical amplifiers.

30. The antenna array of claim 20, further including a plurality of radio-frequency amplifiers, each coupled between a respective one of said receptive elements and the bias port of that receptive element's respective optical amplifier for amplifying the radio-frequency signal portion of that receptive element.

31. An antenna array for transmitting a radio-frequency signal, comprising:
   a plurality of optical amplifiers, each having a bias port and each having a nonlinear transfer function between an optical input port and an optical output port;
   a plurality of photodetectors, each coupled to detect an optical signal at the optical output port of a respective one of said optical amplifiers; and
   an array of radiative elements which are each coupled to receive a detected optical signal from a respective one of said photodetectors;
   each of said optical amplifiers providing an optical input port and a bias port for insertion at either port of at least one radio-frequency signal; and
   each of said optical amplifiers providing an optical input port for insertion of an optical signal which is modulated by said radio-frequency signal and detected by the photodetector at that optical amplifier's optical output port to recover said radio-frequency signal.

32. The antenna array of claim 31, wherein each of said receptive elements is a receptive horn.

33. The antenna array of claim 31, wherein each of said receptive elements is a receptive patch.

34. The antenna array of claim 31, wherein each of said receptive elements is a metallic member which forms a receptive aperture.

35. The antenna array of claim 31, wherein each of said receptive elements is a receptive dipole.

36. The antenna array of claim 31, wherein said optical amplifiers are semiconductor optical amplifiers.

37. The antenna array of claim 31, wherein said semiconductor optical amplifiers are polarization-insensitive semiconductor optical amplifiers.

38. The antenna array of claim 31, further including:
   an optical signal generator coupled to the optical input ports of said optical amplifiers; and
   a local oscillator signal generator coupled to the bias ports of said optical amplifiers.

39. The antenna array of claim 38, further including a plurality of radio-frequency phase shifters which are each coupled between said local oscillator signal generator and the bias port of a respective one of said optical amplifiers for selecting the phase of a local oscillator signal portion received by that optical amplifier.

40. The antenna array of claim 31, further including first and second optical signal generators which are each coupled to the optical input ports of each of said optical amplifiers, said first and second optical signal generators providing optical signals for modulation by radio-frequency signals and detection by said photodetectors.

41. An antenna system, comprising:
   an antenna for recieving a radio-frequency signal;
   an optical amplifier having a nonlinear transfer function between an optical input port and an optical output port and having a bias port coupled to said antenna to receive said radio-frequency signal;
   an optical signal generator coupled to deliver an optical signal to said optical input port for modulation by said radio-frequency signal; and
   a photodetector coupled to said optical output port to recover said radio-frequency signal.

42. The antenna system of claim 41, wherein said antenna and said optical amplifier are located at a first site and said optical signal generator and said photodetector are located at a second site spaced from said first site and further including:
   a first optical fiber which connects said optical signal generator and said optical input port; and
   a second optical fiber which connects said optical output port and said photodetector.

43. The antenna system of claim 41, further including a local oscillator signal generator coupled to modulate said optical signal generator with a local oscillator signal for frequency converting said radio-frequency signal.

44. The antenna system of claim 41, wherein said optical amplifier is a semiconductor optical amplifier.

45. The antenna system of claim 44, wherein said semiconductor optical amplifier is a polarization-insensitive semiconductor optical amplifier.

46. An antenna system, comprising:
   an optical amplifier having a nonlinear transfer function between an optical input port and an optical output port;
   a photodetector coupled to detect a radio-frequency signal carried by an optical signal at said optical output port; and
   an antenna coupled to receive and radiate said radio-frequency signal from said photodetector.

47. The antenna system of claim 46, further including first and second optical signal generators coupled to deliver first and second optical signals to said optical input port with said nonlinear transfer function forming intermodulation products of any radio-frequency signals carried by said first and second optical signals.

48. The antenna system of claim 47, wherein said antenna and said optical amplifier are located at a transmitting site and said first and second optical signal generators are located at a processing site spaced from said transmitting site and further including:
   a first optical fiber which connects said first optical signal generator and said optical input port; and
   a second optical fiber which connects said second optical signal generator and said optical input port.

49. The antenna system of claim 46, wherein said optical amplifier is a semiconductor optical amplifier.

50. The antenna system of claim 46, wherein said semiconductor optical amplifier is a polarization-insensitive semiconductor optical amplifier.

* * * * *